United States Patent [19]

Anstin

[11] 4,013,876
[45] Mar. 22, 1977

[54] DOCUMENT SCANNING AND PRINTING SYSTEM AND METHOD

[76] Inventor: Wayne D. Anstin, 10405 Mann Drive, Cupertino, Calif. 95014

[22] Filed: June 16, 1975

[21] Appl. No.: 586,967

[52] U.S. Cl. .......................... 235/151; 340/172.5; 178/DIG. 22; 178/DIG. 27; 358/299
[51] Int. Cl.² ...................... H04N 1/06; G06F 3/14
[58] Field of Search ............... 235/151; 178/69.5 F, 178/7.6, 7.7, DIG. 22, DIG. 27, 6.6 B, 6.6 A, DIG. 24; 445/1; 340/172.5

[56] References Cited

UNITED STATES PATENTS

| 3,050,579 | 8/1962 | Nash et al. | 178/DIG. 22 X |
|---|---|---|---|
| 3,286,083 | 11/1966 | Nielsen | 178/DIG. 22 X |
| 3,585,597 | 6/1971 | Holmerud | 445/1 |
| 3,803,350 | 4/1974 | Lemelson | 178/DIG. 22 X |
| 3,878,559 | 4/1975 | Pugsley | 178/6.6 B X |

Primary Examiner—Edward J. Wise

[57] ABSTRACT

A system in which a video camera scans one or more documents and generates analog electrical signals representative of the information on the documents. The signals may be converted to digital signals and stored in a suitable memory from which they may be recalled or they can be used to drive a microfilm or other printer which serves to print a representation of the document. The printer may be controlled so that the new document contains updated information as required, which information can be derived from another document being scanned by an additional video camera or from storage. The stored signals can be selectively recalled from storage, electronically manipulated and applied to the printer to provide a microfilm or print which may include updated information or be in a new format.

5 Claims, 1 Drawing Figure

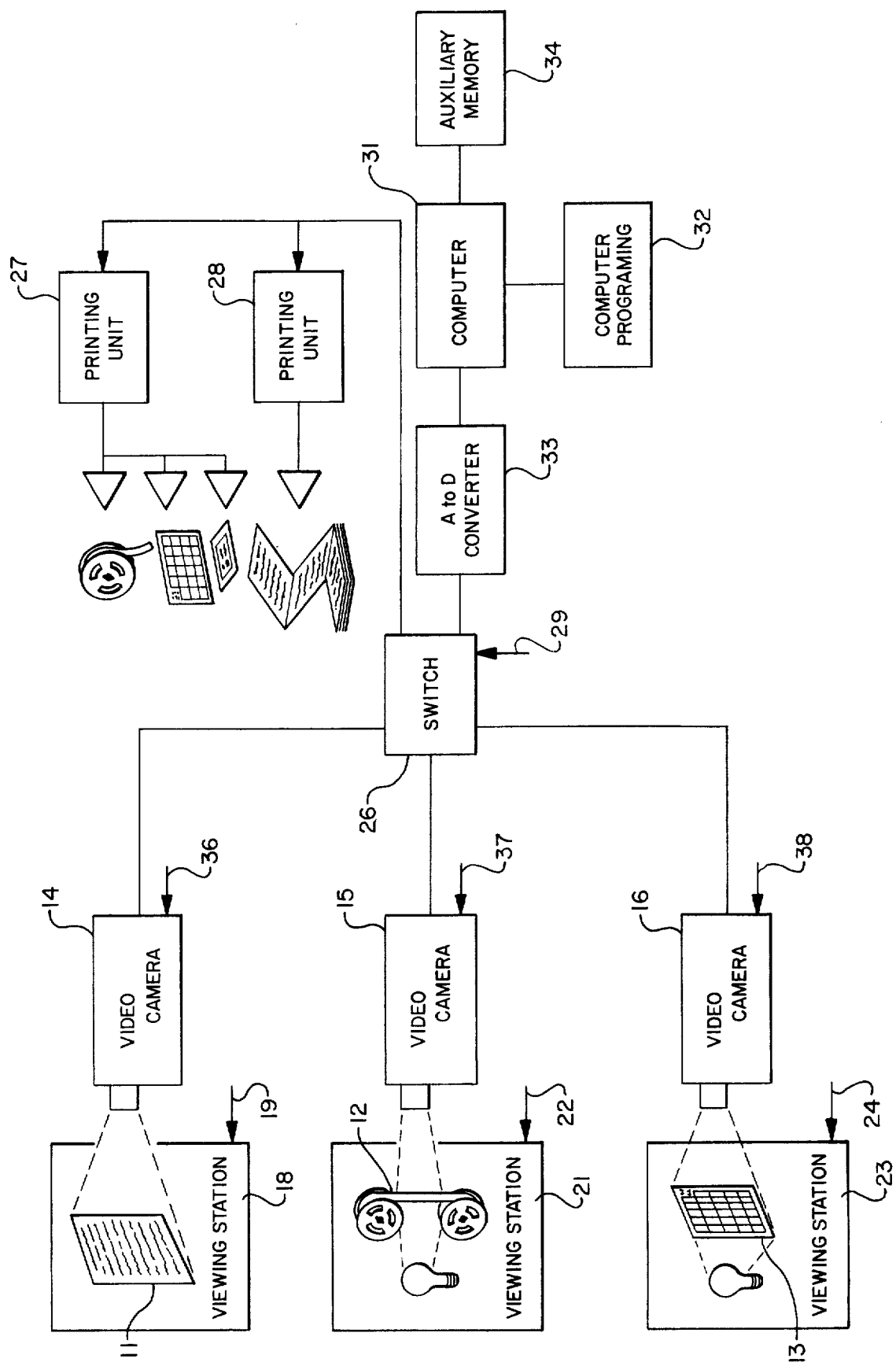

DOCUMENT SCANNING AND PRINTING SYSTEM AND METHOD

BACKGROUND OF THE INVENTION

This invention relates generally to a document scanning and printing system and method and more particularly to a system in which a video camera scans documents, either film or printed, and derives analog electrical signals which can be processed, stored, selectively recalled or applied directly to a printer which prints the information on a document which can be microfilm, microfiche or printed.

Modern information or document control has moved during the past years more and more towards the storage of information on microfilm. Storage has taken various forms: digital, other forms of mathematical methods, photographic images of documentation and holograms. There has been a long need to be able to update this information by being able to add new images, delete obsolete images and/or restructure the sequence in which the images are stored.

An example is in the administration of Social Security records for Social Security benefits. The earnings records for each covered person are scattered throughout many reels of microfilm. An individual conducting a search for all of a person's earnings history may have to go through a large number of separate reels of film gathering information from each in order to put together a complete history. This takes a great deal of time, personnel and lost motion and expense. There are other programs and applications where data pertaining to particular subjects is scattered throughout a plurality of documents in which there is the need to collate, restructure or update. Another example is in updating microfilm data pertaining to a given subject such as personnel records, drawings, processes, etc.

There are presently computer output microfilm systems which accept input electrical signals and print microfilm and microfiche and other documents. What is presently needed is an integrated system which can scan one or more documents, generate and process electrical signals and provide for compiling and updating information on mircrofilm, microfiche or in the form of printed documents.

OBJECTS AND SUMMARY OF THE INVENTION

It is an object of the present invention to provide a system whereby addition, deletion and rearrangement of images of documentation stored on microfilm or microfiche can be automatically, economically, rapidly and efficiently accomplished.

It is another object of the present invention to provide a system whereby hard copy documentation, images of documentation, or displays of mathematical data representing documentation, can be scanned, stored electronically, manipulated, reproduced and/or displayed.

The above and other objects of the invention are achieved by a system which includes one or more video cameras for viewing documents such as printed pages, mircofilm of microfiche to generate electrical signals which can then be stored and recalled electrically, rearranged and/or updated and used to print new documents.

BRIEF DESCRIPTION OF THE DRAWINGS

The single drawing illustrates a system in accordance with the invention.

DESCRIPTION OF PREFERRED EMBODIMENTS

Referring to the FIGURE, the documentation to be processed may be in the form of printed documents 11, mircofilm 12 or microfiche 13, among other types of documentation. The documentation is scanned by an associated video camera 14, 15 and 16, respectively, which may, for example, be a high resolution video camers such as sold by Sierra Scientific Corp., Model LSU-1.5R, or equivalent.

The video cameras serve to scan the documents and provide at their outputs analog video electrical signals representative of the information contained on the document. The printed documents 11 may be manually fed to the viewing station 18 where they are scanned by the video camera 14, or they may be presented sequentially and in synchronism with operation of the system by a suitable automatic feeding device associated with the station. When automatic or synchronous feeding is employed, control signals 19 are applied to the station. Similarly, the microfilm 12 may be mounted upon a suitable microfilm feed station 21 which may be manually operated or electronically controlled via the control signals 22. The microfiche 13 may also be manually presented or automatically fed to the station 23 which can be controlled via the signals 24. The video output from the one or more video cameras are applied to a video switching unit 26 which serves to direct the video output directly to printing units 27 and 28 responsive to control signal 29. The printing unit 27 serves to form microfilm, microfiche or single frames of information and the unit 28 serves to provide printed information. The unit 27 may, for example, be a Singer Corporation Computer Microfilm PLOTTER/PRINTER Model MS7000/MS6000, or equivalent, while the printer 28 may be Varian Associates Status Model 42 or equivalent paper printer. In either event, the switching unit 26 is controlled by control signal 25 from controller 31 to selectively apply signals to the printers 27 and 28 which, in turn, form the microfilm, microfiche or other printed documentation. For example, it might be desirable to update the microfiche 13 with new information from document 11. In such event, the video camera 16 is caused to scan the microfiche 13 under control of the controller 31. The controller will serve to direct the video information from the camera 16 directly to the printer 27 until it recognizes the document on the microfiche to be updated, at which time the controller 31 controls switch 26 to switch to the video camera 14 and presents the video signals from that camera to the printer 27 whereby to print the new document at the selected location on the microfiche. Additional new documents may be inserted as required. The video camera 16 continues to scan the original microfiche for retained information thereby providing a new microfiche including one or more updated frames.

In a similar manner, the system may be used to update mircrofilm 12 or to update a series of documentation 11 all in response to a controller. The controller can be part of a computer such as an IBM Model 360-40, or equivalent. Control instructions can be inserted in the computer either by a keyboard 32 or other equivalent programming means. In the alternate, the controller may be a simple controller associated with an intelligent printer such as the computer microfilm plotter described above.

In certain applications it is desirable to rearrange the information which is derived from the documentation. In this event, the output from the video cameras is applied via the switch 26 to an A to D converter 33 which serves to provide digital output signals which are applied to the computer 31 and stored in the computer memory or in auxiliary memory 34. Each document is stored with the proper identification as, for example, in the Social Security case, identified by the Social Security number of the card holder. After all of the documentation has been scanned by the video cameras and stored in memory, the computer which is suitably programmed searches for given documentation, collates and rearranges the documentation and presents an output signal to the associated printers 27 and 28 which will then form a new document containing collated information which originally may have been dispersed over a plurality of documents and in various forms such as on paper, microfilm and microfiche.

The computer controls the video cameras 14, 15 and 16 via lines 36, 37 and 38 and the associated units 18, 21 and 23 to present selected documents to the video displays and to generate video signals for entry into the computer storage or to the printers 27 and 28.

As described, all the information contained in the various documents has been scanned by the video cameras and converted to digital signals for storage. The computer can be instructed by the computer control unit to manipulate and rearrange the sequence of the digital groups as necessary and to update or substitute as necessary. The computer control unit can then instruct the computer to emit these groups of digital data in the rearranged sequence to the printers 27 and 28 whereby to produce new microfilm, microfiche, frames or printed documents. After the microfilm has been exposed, the microfilm is taken from the system for standard film processing with external film processing equipment.

Since this system provides for a variety of information inputs and manipulation, it is important to note several unique benefits that can be derived from the manner in which the system functions. As can be seen from the drawing, more than one high resolution video camera can be employed as part of the system. It is possible to add as many video cameras as required. The cameras themselves are standard high resolution cameras. The scan rate of the video camera is controlled by the setting of the video electronics and the lenses used by the camera to scan the information being displayed to it. Generally, the type in information being scanned by the video cameras determines the scan speed per second and the lens employed.

The FIGURE shows a variety of types of information which can be processed and the ability to select a variety of display unit, or units, and/or video camera configurations to meet the variety of type, or types, of information being displayed and scanned. It will be possible, for example, for an application to call for several reel film display stations 21 to be scanned by a corresponding number of video cameras 15. The computer 31, through its program for this application, will control the speed of the reel film stations 21 and their corresponding video scan cameras 15 as they operate simultaneously. The computer 31, through its program, will direct the flow of digitized groups of information, representing the reel film images being scanned, into the computer memory 34. This direction of flow will be both at the rate at which the digitized groups of information are entered into the computer memory 34 as well as the sequence of digital inputs from the various video cameras.

Once all of the digitized images of information from the reels of film have been entered into the computer memory 34, the computer program, as controlled from the programming means 32, can rearrange the order of the digitized images, delete those digital groups not required and create a new microfilm in whatever format ordered, reel, fiche and/or aperture card, through the computer output microfilm unit 27.

The addition of new images not formerly on the original film, contained in the reel film display station 21 scanned, can be accomplished by adding a paper documentation display station 18 and corresponding video camera 14 into the system. As the paper documentation is being collated before being fed into its display device, the identification code, or position reference point, of the image on the reel of original film that the hard document to be scanned will replace, is entered into the control program logic of the computer.

The computer control program directs the paper documentation display station 18 to advance the first paper document that is to replace an image on the existing reel of film into the position where it can be scanned by its corresponding video camera 14. The computer program also directs the reel display station 21 to begin advancing the reel of film images past its corresponding video camera 15. The video camera 15 is scanning the images and sending the analog signal groups representing the scanned images, converted to digital signals by the analog to digital coverter 33, to the computer memory 34. The video camera 15 that is scanning the images on the advancing reel of film in the reel film display station 21, is also sending to the computer the reference position number, on the film, of each image it scans.

When the video camera 15 sends the position reference number of the image on the reel that is to be replaced by the scanning of the paper documentation being scanned by video camera 14, the computer control program switches the switch 26 from video camera 15 to video camera 14 and allows the analog signal representing the paper documentation scanned by video camera 14 to enter into the computer memory via the A to D converter 33 as digital information. This digitized signal group replaced the signal group in the memory that would have come from the image being scanned by video camera 15, had not the computer 31 blocked out video camera 15. The reel of film images, in the reel film display 21, continues to be advanced and scanned by video camera 15. If any further paper documentation has been programmed by the setting up of the computer 31 control program to replace images on the reel of film in reel film station 21, the above process is repeated until all paper documentation digitized signal groups have been entered into the computer memory, replacing signal groups of images on the reel of film being scanned by video camera 15 that were to be deleted.

The computer 31 can now be instructed by the control program to manipulate the digitized signal groups if necessary. The computer 31 can now transmit the digitized signal groups to the computer output unit 27 where the new film, in whatever format is instructed, will be produced.

If there is no manipulation of the digitized signal groups, representing both the images contained on the reel of film scanned by video camera 15 or the paper documentation scanned by video camera 14, the computer 31 program can send the analog signal output of the video cameras directly to the unit 27 to produce the new film by controlling which analog signal group is to be deleted from the reel film and replaced by the image signal groups representing the scanned paper documentation.

The same technique of updating, or changing images, on microfiche can be employed as it was for the reel filmed images. Control of which video camera will be allowed to send its signal groups to either the computer 31 or directly to units 27, 28 is by the computer control program. By using this technique, images can be deleted from existing microfiche and replaced on the newly generated microfiche by images of paper documentation scanned by camera 14, under the direction of the computer control program.

Using the high resolution video camera as a scan device, it is also possible to scan hard copy paper documentation and transmit the video cameras analog signal output directly into the units 27, 28. This means that since the video camera 14 emits an analog signal and the unit 27 accepts an analog signal, the paper documentation being scanned by the video camera 14 can produce microfilm directly as fast as the electronic speed of the video camera 14 and the unit 27 will permit. The computer 31, in this application, acts only as a system control unit.

Thus, it is seen that there has been provided a system which facilitates the scanning of documents such as microfilm, microfiche or printed pages and the generation of new documents which are updated, rearranged, collated or otherwise processed.

What is claimed is:

1. A document scanning and printing system for producing a printed document having updated information from documents containing information including at least one video camera for viewing the documents containing information and generating an electrical signal representative of the information, means for presenting the documents containing information to said video camera whereby said camera generates said electrical signal, means for processing said electrical signal to generate a new signal having updated information and means responsive to said new signal for producing a printed document having the updated information.

2. A document scanning and printing system as in claim 1 in which said electrical signals and analog signals including an analog to digital converter for receiving said analog signal and generating a digital representation thereof, means for storing said digital representation, and means for receiving from storage selected stored digital representation to form said new signal.

3. A document scanning and printing system as in claim 2 in which said processing means serve to manipulate said digital signals.

4. A document scanning and printing system as in claim 2 wherein said new signal includes portions of signals directly from said video camera and portions from said storage means.

5. A document scanning and printing system as in claim 1 including a plurality of video cameras and a plurality of documents each video camera generating electrical signals representative of the corresponding document and a switching means serving to selectively apply electrical signals from individual cameras to said document producing means whereby to provide said new signal for producing a document including updated information.

* * * * *